March 23, 1926.
T. R. DAVIS
1,578,239
CAST METAL VEHICLE WHEEL
Filed Feb. 25, 1925   2 Sheets-Sheet 1
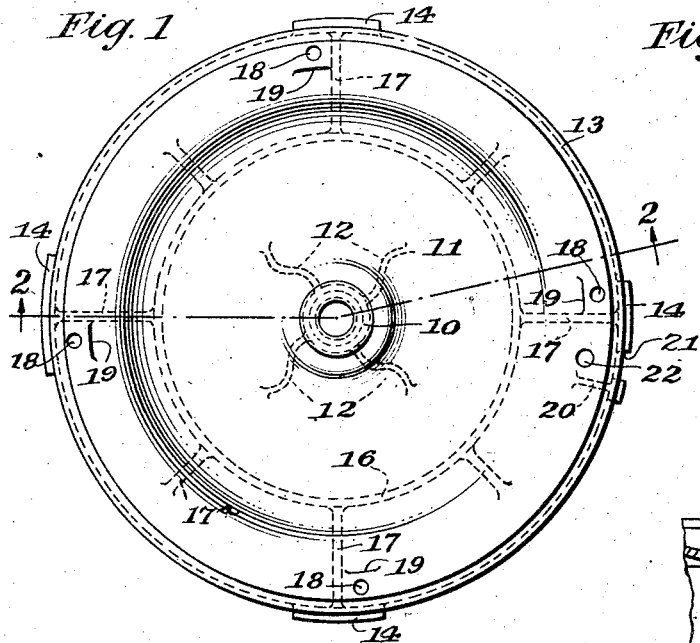
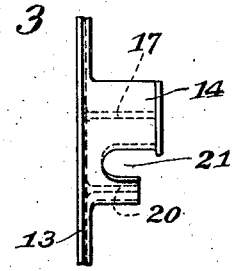
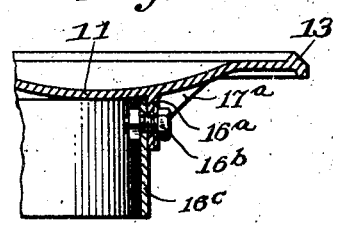
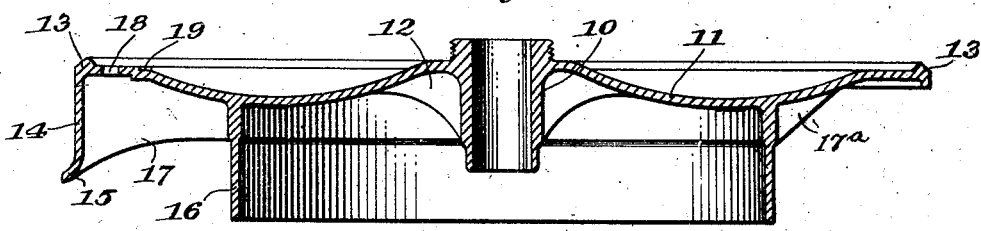
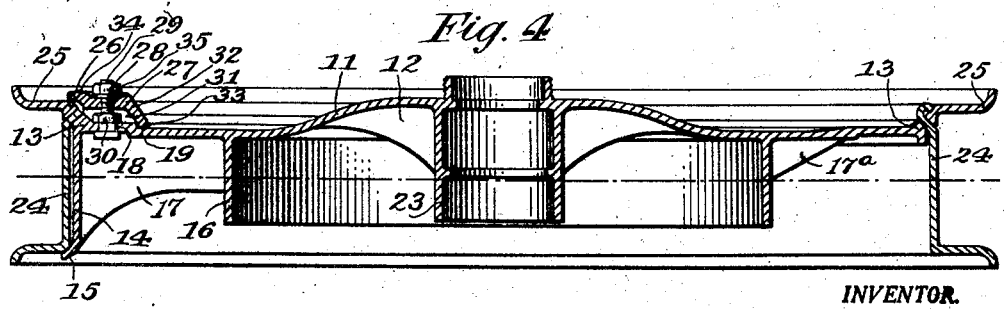
INVENTOR.
Thomas R. Davis
BY
Chamberlain & Newman
ATTORNEYS.

March 23, 1926.
T. R. DAVIS
CAST METAL VEHICLE WHEEL
Filed Feb. 25, 1925  2 Sheets-Sheet 2
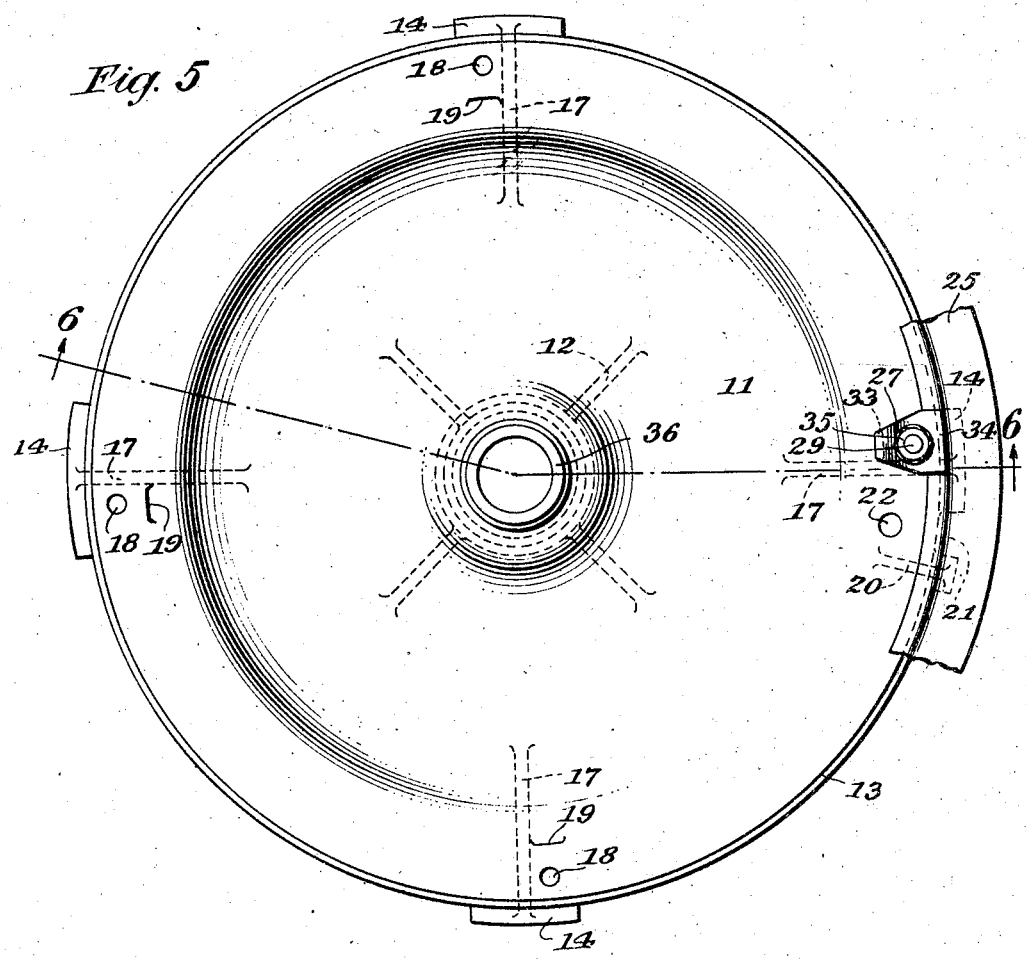
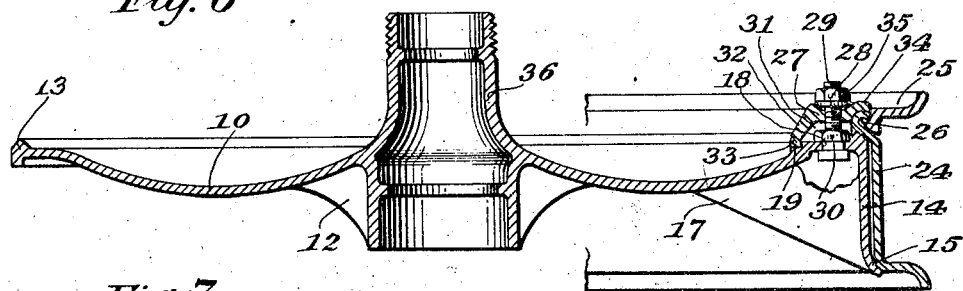
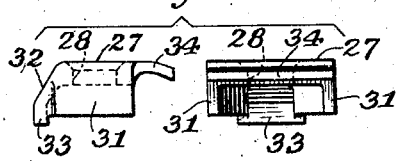
INVENTOR.
Thomas R. Davis
BY
Chamberlain & Newman
ATTORNEYS.

Patented Mar. 23, 1926.

1,578,239

UNITED STATES PATENT OFFICE.

THOMAS RICE DAVIS, OF FAIRFIELD, CONNECTICUT, ASSIGNOR TO THE EASTERN MALLEABLE IRON CO., OF BRIDGEPORT, CONNECTICUT, A CORPORATION OF CONNECTICUT.

CAST-METAL VEHICLE WHEEL.

Application filed February 25, 1925. Serial No. 11,448.

*To all whom it may concern:*

Be it known that I, THOMAS RICE DAVIS, citizen of the United States, and resident of Fairfield, in the county of Fairfield and State of Connecticut, have invented certain new and useful Improvements in Cast-Metal Vehicle Wheels, of which the following is a specification.

My invention relates to an improved metal vehicle wheel, an object being to provide such a wheel of disc type, in the form of a single main casting, and a demountable tire carrying rim, adapted to be secured to the periphery of the disc wheel structure.

Another object is to provide a wheel structure of relatively great strength, so as to withstand torsional, weight and side strains, and which will at the same time be of extremely light weight, as compared with cast wheels heretofore in use.

A further object is to provide in such a wheel structure a plurality of spaced rim supporting means integral therewith, and so designed as to provide adequate support for the rim, and at the same time not add greatly to the weight of the wheel.

Another object is to provide an annular rim seat adapted to support the rim adjacent one edge, so that the complete wheel will be of relatively light weight, the rim being at the same time substantially supported about its entire circumference, and it is further proposed to provide spaced rim seats in cooperative relation with said annular seat and adapted to support the rim over its entire width at spaced points.

A still further object is to provide a wheel having an integral brake drum, adapting the same to use as either a front or rear brake-equipped wheel, and also to provide an improved co-relative brake and wheel structure in which the brake is centralized with respect to the central plane of rotation of the wheel, so that the most efficient braking is obtained, this being particularly important with front wheels to permit unimpaired steering.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a front elevation of a cast wheel, according to the invention, adapted for rear axle use, and provided with a brake drum;

Fig. 2 is a sectional view thereof, along the line 2—2 of Fig. 1;

Fig. 2$^a$ is a fragmentary sectional view of a modification in which a detachable brake drum ring is employed;

Fig. 3 is a detail side view of one of the rim seats;

Fig. 4 is a sectional view of a modified form of the invention, adapted for front wheel use, and provided with a brake drum;

Fig. 5 is a front elevation of a further modified form, adapted for front wheel use, without a brake drum, and showing a portion of the tire carrying rim;

Fig. 6 is a sectional view thereof, taken along the line 6—6 of Fig. 5; and

Fig. 7 is a detail view, showing in side and end elevation a rim lug, according to the invention.

Similar reference characters indicate corresponding parts throughout the several figures of the drawings.

Referring to the drawings, and more particularly to Figs. 1 to 3 thereof, the embodiment of the invention shown therein comprises a hub 10, illustrated as adapted for use upon the rear axle spindles of an automobile, but which may be designed for front axle use, and an integral web or disc 11, dished between the hub and a flat marginal portion, and reinforced by radial ribs 12, integrally formed between the hub and the inner side of the web.

At its periphery the web is provided with an annular beveled bead 13, and at equally spaced points integral rim seats 14 are formed, extending rearwardly and at approximately right angles to the web, and being flared at their inner ends, as at 15, to retain the tire carrying rim thereon.

In inwardly spaced relation to its periphery the web is provided at its inner surface with an annular cylindrical brake drum portion 16, formed integrally therewith, and reinforced by radial ribs 17 extending between the same and the rim seats 14, and which also reinforce and support said rim seats. Radial reinforcing ribs 17$^a$ are also provided between the drum and web intermediate the ribs 17. Bolt holes 18 are provided in the web adjacent the rim seats 14 for the purpose of receiving the retaining bolts for the rim clips, and in inwardly spaced relation and in radial alignment with the holes 18 the web is provided with pockets 19 for positioning the ends of the rim retaining clips.

One of the rim seats 14 is wider than the others, having an additional reinforcing rib 20, and is provided with an open-ended aperture 21 for receiving the tire valve stem, the end of which is adapted to be projected through a hole 22 in the web. The opposed rim seat is also wider than the others, for the purpose of counterbalancing the apertured rim seat and tire valve stem, and therefore balancing the wheel.

In Fig. 2ª there is illustrated a modification in which a brake drum element in the form of an annular flange 16ª is integrally formed upon the inner side of the web, and has attached thereto by bolts 16ᵇ a cylindrical brake drum ring 16ᶜ, preferably formed of steel, and which being removable may be renewed after excessive wear. It will be understood that the other illustrated embodiments may be similarly provided with brake drum means.

In Fig. 4 I have illustrated a modification in which the cross-section of the web is such that the intermediate portion is brought substantially forward of the central plane of rotation of the rim (indicated by the dot and dash line), and the brake drum is circumferentially aligned with the rim, so that the central plane of rotation of the tire, and therefore the point of contact with the ground, passes centrally through the brake drum, and the braking resistance is consequently applied in direct line with the torsional moment of the wheel, and the maximum braking efficiency is thus obtained. This is particularly important with front wheels, where any off center resistance is apt to impair the steering of the wheels, and the hub 23, illustrated in this form, is of the front axle type. It will be understood, however, that the wheel may be used upon the rear or driving axles, in which case a hub of the type shown in Figs. 1 and 2 will be employed.

The flanged tire carrying rim 24, illustrated in this embodiment, is provided with a removable rim flange 25 engaged in an annular groove 26 of the rim, and is retained in engagement with the annular rim seat 13 and the spaced rim seats 14 by a series of retaining clips 27, of a novel type adapted for easy attachment and which provides a closed protective structure to prevent mud and dirt from becoming lodged therein. These clips, according to the invention, are apertured as at 28 for engagement with clip bolts 29, headed at their inner ends and engaged in the holes 18, being fixedly secured therein to prevent loss by means of locknuts 30 secured down upon the outer surface of the wheel. The clip is flanged downwardly at its inclined sides to provide side closure walls 31, the inner end being flanged downwardly at an incline, as at 32, and projected at its end to provide a tooth 33 for engagement in the recess 19 of the wheel. At the outer end of the clip there is provided a hook-shaped flange 34, which snugly engages over the annular recessed portion 26 of the rim, and is clamped down to retain the same upon the rim seats by means of a nut 35 screwed down upon the projecting end of the clip bolt. The depending side walls 31 of the clip serve to form a protective closure for the stud and nut 30.

It will be understood that the rim, while not illustrated in connection with the embodiment disclosed in Figs. 1 and 2, may be of similar type and secured in the same manner, and also that in any of the forms other well known types of rims may be employed.

In Figs. 5 and 6 there is shown a further modification, substantially similar to the form shown in Figs. 1 and 2, without the brake drum, however, and provided with an integral front axle spindle hub 36. This form may also have a brake drum, if desired.

The wheel, according to my invention, may be cast by simple and efficient casting methods, and a light structure of great strength is provided. The provision of the spaced rim seats, in connection with the annular rim seat, produces a cast solid disc structure, which at the same time is extremely light in weight and capable of supporting the rim under very heavy loads and in traverse over rough and uneven roads.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:

1. In a vehicle wheel, a casting including an integral hub and circular web portion, an annular rim seat on said web portion, spaced rim seats formed integrally with said web portion, radial reinforcing ribs integrally formed between said spaced rim seats and said web portion, a demountable rim engaging said annular seat at its forward portion and said spaced rim seats at their rearward portion, and means adapted to secure said rim to said seats.

2. In a vehicle wheel, a casting including an integral hub and circular web portion, an integral brake drum element formed upon the inner side of said web portion, an annular rim seat on said web portion radially spaced from said brake element, spaced rim seats formed integrally with said web portion, a demountable rim engaging said annular rim seat at its forward portion and said spaced rim seats at their rearward portion, and means adapted to secure said rim to said seats.

3. In a vehicle wheel, a casting including an integral hub and circular web portion, an integral brake drum element formed upon the inner side of said web portion, an annular rim seat on said web portion radially spaced from said brake element, spaced rim seats formed integrally with said web portion, radial reinforcing ribs integrally formed between said rim seats, web portion and the outer surface of said brake drum element, a demountable rim engaging said annular seat at its forward portion and said spaced rim seats at their rearward portion, and means adapted to secure said rim to said seats.

4. In a vehicle wheel, a casting including an integral hub and web portion, a brake drum element integrally formed upon the inner side of said web portion, radial reinforcing ribs integrally formed between said brake drum element and said web, an annular rim seat integrally formed on said web portion in radially spaced relation to said brake drum element, a demountable rim engaging said annular seat, and means adapted to secure said rim to said seat.

Signed at Bridgeport, in the county of Fairfield and State of Connecticut this 24 day of February, A. D. 1925.

THOMAS RICE DAVIS.